(12) United States Patent
Vishlitzky et al.

(10) Patent No.: US 6,330,655 B1
(45) Date of Patent: Dec. 11, 2001

(54) DIGITAL DATA STORAGE SUBSYSTEM INCLUDING DIRECTORY FOR EFFICIENTLY PROVIDING FORMATTING INFORMATION FOR STORED RECORDS

(75) Inventors: Natan Vishlitzky; Haim Kopylovitz, both of Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/378,644

(22) Filed: Aug. 20, 1999

(51) Int. Cl.⁷ .................................................. G06F 12/10
(52) U.S. Cl. ............................................ 711/208; 711/112
(58) Field of Search ...................................... 711/112, 156, 711/208, 113

(56) References Cited

U.S. PATENT DOCUMENTS

| | | | |
|---|---|---|---|
| 5,421,001 | * | 5/1995 | Methe .................................. 707/1 |
| 5,809,435 | * | 9/1998 | Yeger et al. ......................... 707/1 |
| 6,003,114 | * | 12/1999 | Bachmat ............................. 711/113 |
| 6,101,588 | * | 8/2000 | Farley ................................. 711/168 |

* cited by examiner

*Primary Examiner*—Hiep T. Nguyen
(74) *Attorney, Agent, or Firm*—Richard M. Jordan; John M. Gunther (57) ABSTRACT

A digital data storage system comprising a mass storage subsystem in which information is stored on one or more disk storage units, with a storage element constituting a track on a disk storage device and each track storing a plurality of records. Each track in each disk storage device of the digital data storage system is associated with a descriptor. In that embodiment, when the control device retrieves the contents of a record, it can use the format definition type identifier of the descriptor associated with the track to determine the format definition type for the track, use the specific format information to determine the location and size of the record on the track, and retrieve the record. Similarly, if the record is to be updated, the control device can use the format definition type identifier of the descriptor associated with the track to determine the format definition type for the trap, use the specific format information to determine the location and size of the record on the track, and update the record on the track. A number of format definition types are disclosed.

20 Claims, 3 Drawing Sheets

DIGITAL DATA STORAGE SUBSYSTEM INCLUDING DIRECTORY FOR EFFICIENTLY PROVIDING FORMATTING INFORMATION FOR STORED RECORDS

FIELD OF THE INVENTION

The invention relates generally to the field of digital computer systems and more particularly to a digital data storage subsystem including a directory for efficiently providing formatting information for records stored by the digital data storage subsystem.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), and U.S. patent application Ser. No. 07/893,509 filed Jun. 4, 1995, in the name of Moshe Yanai, et al., entitled "System And Method For Dynamically Controlling Cache Management," both of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer data that is transferred from the storage devices for use by the respective computers, and, if the data has been modified, transferred back from to the storage devices for storage.

In the systems described in the aforementioned patent and patent applications, a directory table is used to provide information concerning the data that is stored in the mass storage subsystem. In one embodiment, in which the mass storage subsystem stores data on a number disk storage devices, the table includes information concerning selected characteristics of each of the CKD records stored in the mass storage subsystem, organized by device, cylinder and read/write head or track, and includes such information as record size and certain formatting characteristics. The amount of data that can be stored by individual storage devices is continually increasing over time, both in terms of the number of cylinders that each device can store and in the amount of data each track can store, and so the amount of information which such tables needs to store can become quite large. U.S. patent application Ser. No. 08/790,642, filed: Jan. 29, 1997, in the name of Natan Vishlitzky, and entitled "Digital Data Storage Subsystem Including Directory For Efficiently Providing Formatting Information For Stored Records," assigned to the assignee of the present invention and incorporated herein by reference, describes a directory table in which the amount of information required for the various records can be advantageously reduced; however, it would be helpful to further reduce the size of the directory table.

SUMMARY OF THE INVENTION

The invention provides a new and improved digital data storage subsystem including a directory for efficiently providing formatting information for records stored by the digital data storage subsystem.

In brief summary, the invention provides a digital data storage system comprising a plurality of storage elements, a memory and a control device. The storage elements are configured to retrievably store a series of records, the records being stored in a format comprising one of a plurality of format definition types. The memory stores a descriptor for describing the format of the records stored by the storage device, the descriptor including a format definition type identifier that identifies the one of the plurality of format definition types in which the records are stored, and specific format information providing further formatting information within the one of the plurality of format definition types in which the records are stored. The control device is configured to, in connection with retrieval of one of the records from the storage element, use the format definition type identifier and specific format information in the descriptor in connection with retrievals of ones of the records from the storage device.

In one embodiment, the digital data storage system is in the form of a mass storage subsystem in which information is stored on one or more disk storage units, with a storage element constituting a track on a disk storage device and each track storing a plurality of records. Each track in each disk storage device of the digital data storage system is associated with a descriptor. In that embodiment, when the control device retrieves the contents of a record, it can use the format definition type identifier of the descriptor associated with the track to determine the format definition type for the track, use the specific format information to determine the location and size of the record on the track, and retrieve the record. Similarly, if the record is to be updated, the control device can use the format definition type identifier of the descriptor associated with the track to determine the format definition type for the trap, use the specific format information to determine the location and size of the record on the track, and update the record on the track. A number of format definition types are disclosed.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
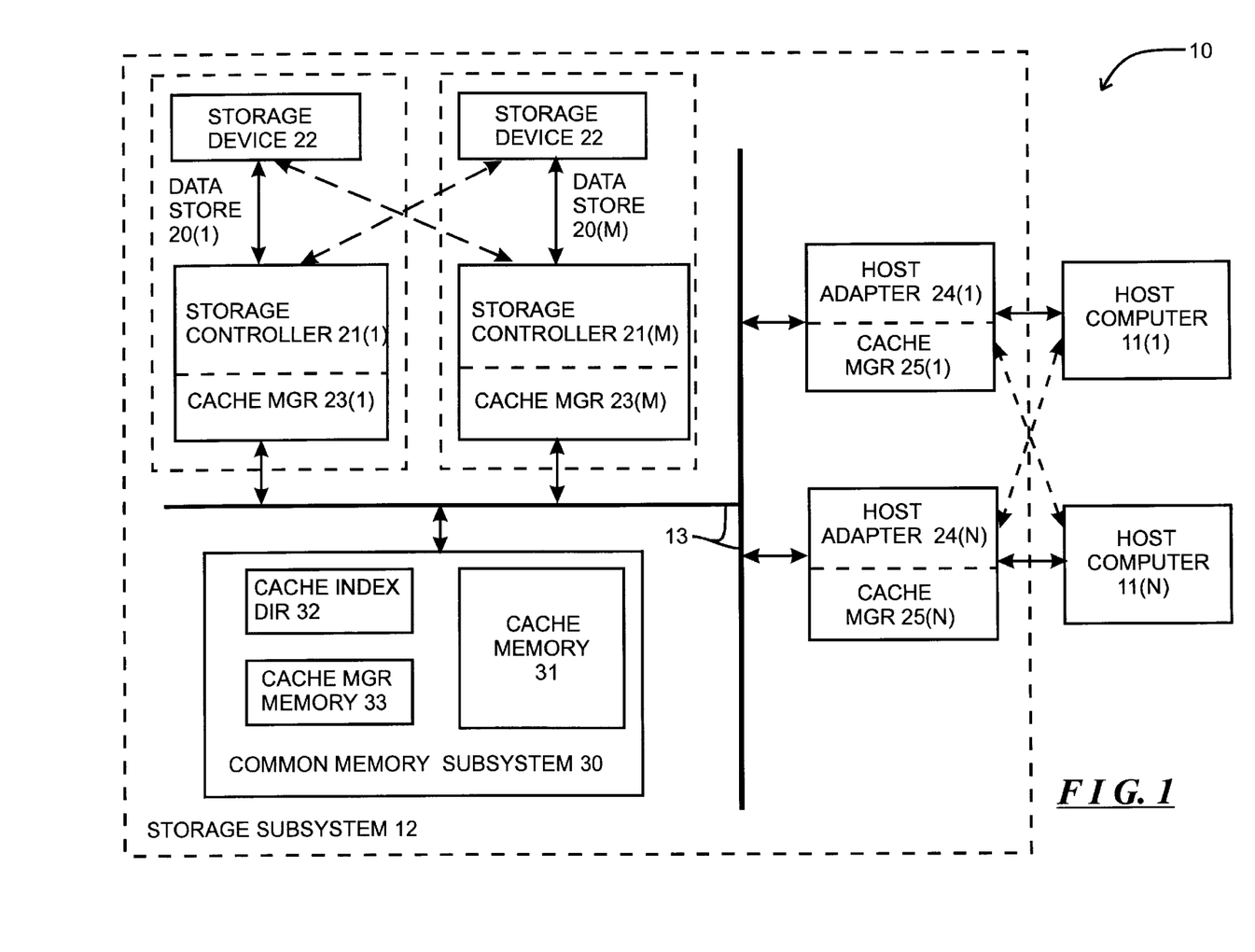
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) may comprise, for example, a personal computer, workstation, or the like which may be used by a single operator, or a multi-user computer system which may be used by a number of operators. Each host computer 11(n) is connected to an associated host adapter 24(n), which, in turn, is connected to bus 13. Each host computer 11(n) may control its associated host adapter 24(n) to perform a retrieval operation, in which the host adapter 24(n) initiates retrieval of computer programs and digital data (generally, "information") from the digital data storage subsystem 12 for use by the host computer 11(n) in its processing operations. In addition, the host computer 11(n) may control its associated host adapter 24(n) to perform a storage operation in which the host adapter 24(n) initiates storage of processed data in the digital data storage subsystem 12. Generally, retrieval operations and storage operations in connection with the digital data storage subsystem 12 will collectively be referred to as "access operations."

In connection with both retrieval and storage operations, the host adapter 11(n) will transfer access operation command information, together with processed data to be stored during a storage operation, over the bus 13. Access to the bus 13 is controlled by bus access control circuitry which, in one embodiment, is integrated in the respective host adapters 24(n). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13, and in one embodiment includes bus access control circuitry for controlling access to bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent Application Ser. No. 08/532,240 filed Sep. 25, 1995, in the name of Eli Shagam, et al., and entitled Digital Computer System Including Common Event Log For Logging Event Information Generated By A Plurality of Devices assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer information transferred between the host computers and the data stores 20(m) during an access operation.

The common memory subsystem 30 includes a cache memory 31, a cache index directory 32 and a cache manager 33, which are generally described in U.S. patent application Ser. No. 07/893,509 filed Jun. 4, 1995, in the name of Moshe Yanai, et al., entitled "System And Method For Dynamically Controlling Cache Management," assigned to the assignee of the present invention and incorporated herein by reference. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

Figure 2:
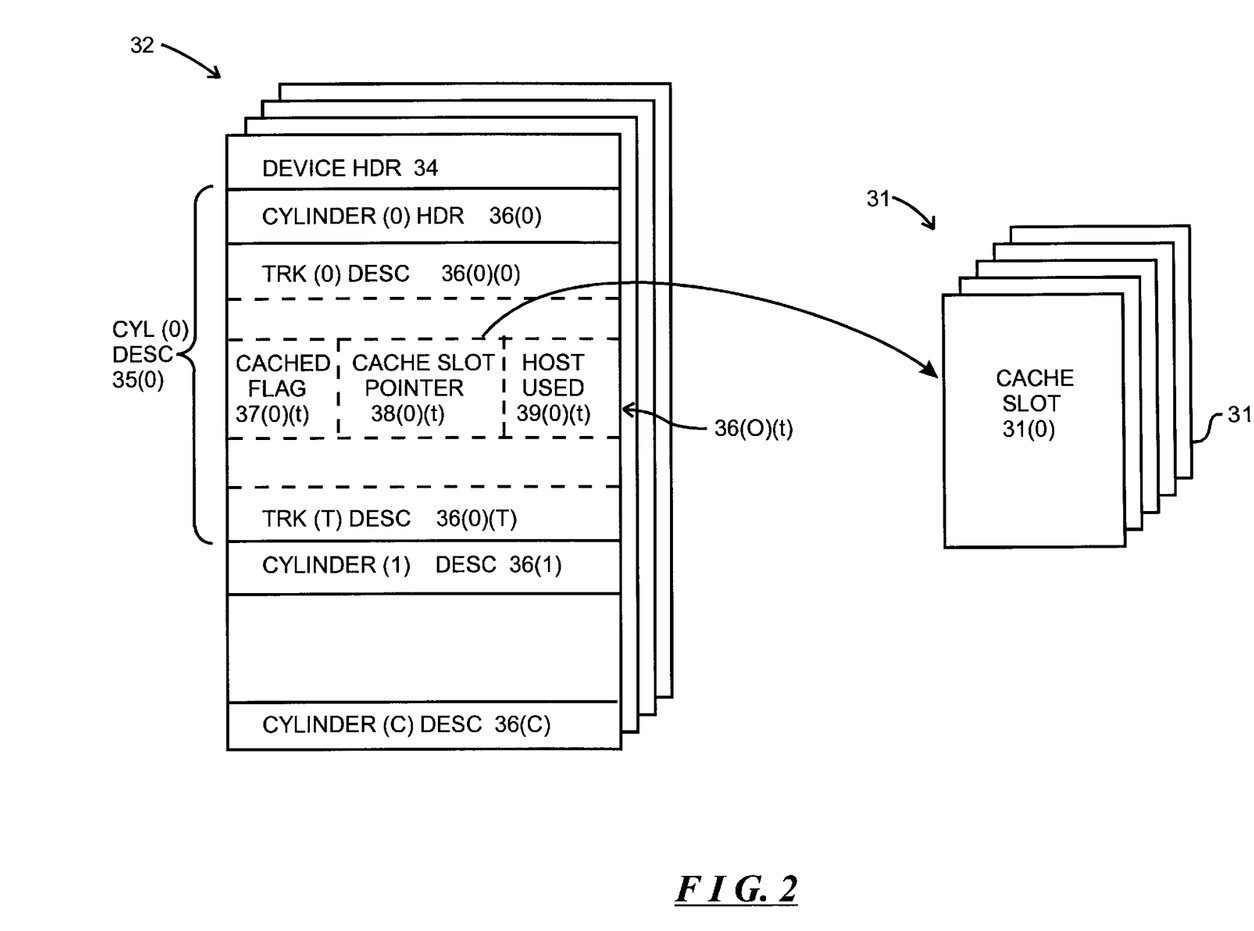
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(s)). The storage locations are, in turn, identified by a series of addresses, with the starting address of a cache slot being identified by a base address. The cache slots 31(s), in turn, operate as the cache memory's buffer as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(0) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(0) through 35(c)(T) (generally identified by reference numeral 35(t)), each of which is associated with one of the tracks in the cylinder 35(c). Each track descriptor 35(c)(t), in turn, includes information for the associated track of the storage device 22, including whether a copy of the data stored on the track is cached in the cache memory 31, and, if so, the identification of the cache slot 31(s) in which the data is cached. As will be described below in greater detail, each track descriptor 35(c)(t) includes a cached flag and a cache slot pointer. The cached flag, if set, indicates that the data on the track associated with the track is cached in a cache slot 31(s), and the cache slot pointer 38(s)(t) identifies the particular cache slot in which the data is cached. In addition, each track descriptor 35(c)(t) includes a used flag 39(c)(t) which may be used to indicate whether the data, after being stored in the cache slot identified by the cache slot pointer, has been used by the host computer 11(n) during a retrieval operation. This "host used" flag may be used to determine whether the cache slot may be re-used for another access operation.

Each of the host adapters 24(n) and each of the device controllers 21(m) includes a cache manager 25(n) and 23(m), respectively, to access to the cache memory 31, cache index directory 32 and cache manager memory 33. The particular operations performed during an access operation will depend on a number of factors, including the access operation to be performed, whether or not the data from the particular track to be accessed is cached in the cache memory 31, and whether or not the data contained in a cache slot 31(s) has been modified or updated by a host adapter's cache manager 25(n) during a storage operation. As described in the aforementioned Shagam application, the host adapters 24(n) typically perform storage and retrieval operations in connection with data in the cache memory 31, and the device controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations). In performing the staging and de-staging operations, the device controllers 21(m) generally transfer data to and from the cache memory 31 in units of a track, that is, they will during a staging operation transfer all of the data in a track from a storage device 22 to a cache slot 31(s) in the cache memory 31, and during a de-staging operation copy all of the data in a slot in the cache memory 31 to the track of the storage device 22 from which it was originally staged.

The cache manager memory 33 maintains a number of work lists which are used to control operations by the host adapters 24(n) and storage controllers 21(m) during an access operation. In particular, the cache manager memory 33 includes a cache slot replacement list, a pending write list and various lists which the host adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 23(m) uses the cache slot replacement list to select a cache slot 31(s) into which it will load the data retrieved from a storage device. (The aforementioned Shagam application describes a modified least-recently-used cache-slot re-use methodology used in one embodiment of the invention). The pending write list is used to identify cache slots 31(s) which contain updated data, which has not been written to a storage device. During de-staging operations, the storage controllers' cache managers 23(m) will use the write pending list to identify cache slots to be written to a storage device 22. Preferably, the cache slots 31(s) which are identified in the pending write list will not also be listed in the cache slot replacement list, so that cache slots 31(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n). The host adapters' cache managers 16(m) use the stage request lists to store stage requests to be performed by the respective data stores 20(m), and the data stores' cache managers 23(n) use the stage completion lists to store stage completion messages to indicate to the respective host adapters' cache managers 16(m) that the stage requests have been completed.

Generally, a host adapter 24(n), during a retrieval operation, attempts to retrieve the data from the cache memory 31. However, if the data is not in the cache memory 31, it will enable the device controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the host adapter 24(n) will retrieve the data from the slot. Similarly, during a storage operation, the host adapter 24(n) will determine whether the particular track into which the data is to be written is in a slot in the cache memory 31 and if so will store the data in the slot. However, if the data is not in the cache memory 31, the host adapter 24(n) will enable the cache manager 23(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the host adapter 24(n) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the host adapter 24(n) has only performed retrieval operations therewith), the data in the cache slot corresponds to the data in the storage device 22.

More specifically, as described in the aforementioned Shagam application, during a retrieval operation, the cache manager 25(n) of the initiating host adapter 24(n) will initially access the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag, whether the data from the track is cached in a cache slot 31(s) in the cache memory. If the cached flag indicates that data from the track is cached in a cache slot 31(s), the cache manager 25(n) uses the cache slot pointer 38(t) to identify the particular cache slot 31(s) in which the data is cached and retrieves the required data from the cache slot 31(s).

On the other hand, if the cache manager 25(n) determines from the cached flag that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, use the above-described cache slot replacement list to select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag and loading a pointer to the cache slot in the cache slot pointer.

After the storage controller 21(m) has completed the staging operation, it will load a staging completed message in the stage completion list in the cache manager memory 33 associated with the host computer 11(n) which issued the staging request, and notify the host computer's cache manager 25(n) that a stage completed message has been loaded therein. At some point after receiving the notification, the host computer's cache manager 25(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag, whether the data from the track is cached in a cache slot 31(s) in the cache memory and, if so, use the cache slot pointer 38(t) to identify the particular cache slot 31(s) in which the data is cached and retrieve the required data from the cache slot 31(s). Since at this point the cached flag should indicate that the data from the track is cached in a cache slot 31(s), the host adapter's cache manager 25(n) should be able to complete the retrieval operation.

Similar operations occur during a storage operation, in which data in a particular track is updated, with the additional operation of removing the identification of the cache slot 31(s) containing data to be updated from the replacement list and loading it into the pending write list. During a storage operation, the cache manager 16(n) of the initiating host adapter 24(n) will initially access the cache index table 32(d) in the cache index directory 32 associated with the storage device 22 in which the data to be updated is stored, in particular accessing the track descriptor 36(c)(t) of the cylinder descriptor 36(c) to determine, from the condition of the cached flag, whether the data from the track is cached in a cache slot 31(s) in the cache memory. If the cached flag indicates that data from the track is cached in a cache slot 31(s), the cache manager 25(n) uses the cache slot pointer 38(t) to identify the particular cache slot 31(s) in which the data is cached and loads the update data into the cache slot 31(s). In addition, the host adapter's cache manager 25(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 25(n) determines from the cached flag 37(c)(t) that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag and loading a pointer to the cache slot in the cache slot pointer.

After the storage controller 21(m) has completed the staging operation, it will load a staging completed message in the stage completion queue in the cache manager memory 33 associated with the host computer 11(n) which issued the staging request, and notify the cache manager 25(n) that a stage completed message has been loaded therein. At some point after receiving the notification, the cache manager 25(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag, whether the data from the track is cached in a cache slot 31(s) in the cache memory and, if so, use the cache slot pointer 38(t) to identify the particular cache slot 31(s) in which the data is cached and retrieve the required data from the cache slog 31(s). Since at this point the cached flag should indicate that the data from the tack is cached in a cache slot 31(s), the cache manager 25(n) should be able to complete the storage operation as described above.

As described above, the data stores' cache managers 23(m) also perform de-staging operations using the pending write list to identify cache slots 31(s) which contain updated data to be written back to the original storage device 22 and track whose data was cached in the respective cache slots 31(s). When a cache slot 31(s) is de-staged, since at that point the data in the cache slot 31(s) corresponds to the data on the respective storage device 22, the data store's cache manager 23(m) which performs the de-staging operation will remove the cache slot's identification from the pending write list and return it to the replacement list so that the cache slot 31(s) can be removed. It will be appreciated, however, that a host computer's cache manager 25(n) may perform a number of retrieval operations and/or storage operations in connection with data in the same cache slot 31(s) after the data in the track cached in the slot has been staged and before it can be de-staged, and so data in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 25(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with data cached for the same storage device 22, cylinder and track, without being reused.

Figure 3:
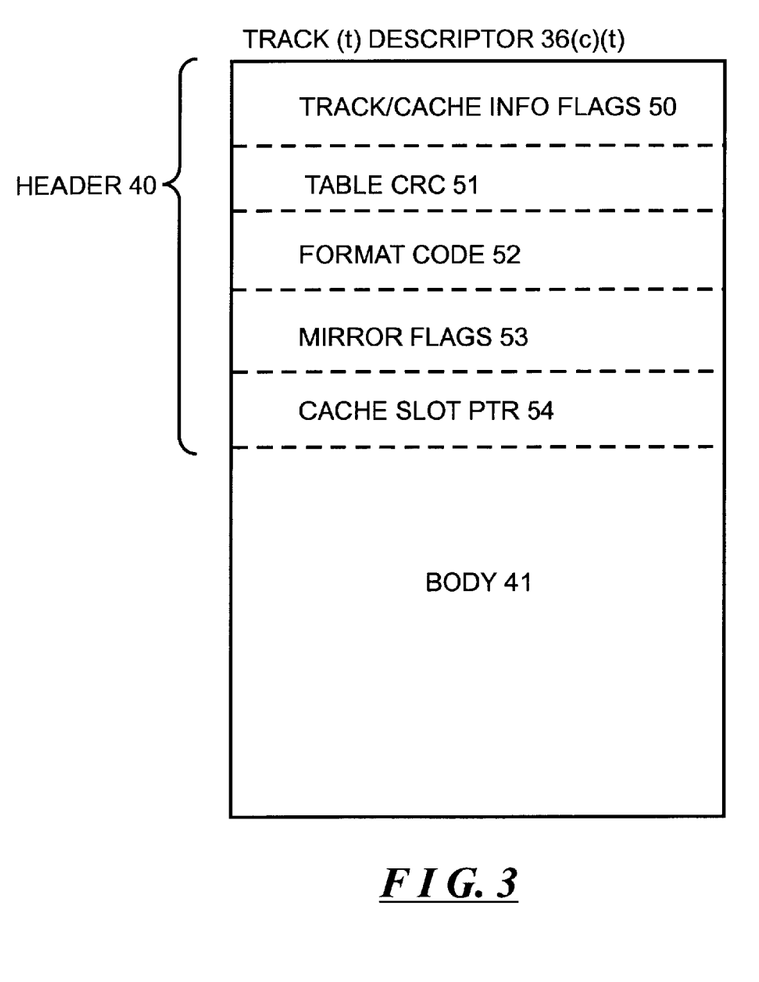
FIG. 3 depicts the structure of a descriptor, useful in the cache memory depicted in FIG. 2, the descriptor providing formatting information for information stored by the storage subsystem.

The invention provides an arrangement for compactly providing track descriptor information in the respective track descriptors 36(c)(t) (FIG. 2), to efficiently accommodate use of storage devices 22 which can store relatively high-density data and reduce the amount of information which would otherwise need to be stored. FIG. 3 depicts the structure of a track descriptor, identified by reference numeral 36(c)(t), for use in connection with one embodiment of the invention.

With reference to FIG. 3, the track descriptor 36(c)(t) includes a header 40 and a body section 41. The header 40 includes information about the track, including such information as whether the track is cached in the cache memory 31 and, if so, a pointer to the cache slot 31(s) in which the track is cached. In addition, the header 40 indicates whether mirror copies exist for the track on other digital data storage systems. The sector CRC section 41, on the other hand, contains record-specific basic information for the respective records in the track. In one embodiment, the records are of fixed-length, such as one or more blocks or sectors (generally referred to as "sectors"), and each track comprises a predetermined number of such sectors.

More specifically, the header 40 includes a number of flags and fields as shown in FIG. 3, including a track/cache information flags field 50, a table CRC field 51, an extended format code field 52, a mirror flags records flag 53, and a cache slot pointer field 54. The track/cache information flags field 50 includes several flags (not separately shown), including a track in cache flag, a prefetched track flag, a track write pending flag, and a permanently cached track flag, all of which are used in managing caching in connection with the track. The track in cache flag, if set, indicates that the track is currently cached in the cache memory 31; when that occurs, the cache slot pointer field 54 contains a pointer that identifies the cache slot 31(s) in which the track is cached. The prefetched track flag, if set, indicates that the data store's cache manager 23(m) prefetched the track and loaded it in the cache memory 31 before it was requested to do so by a host adapter's cache manager 25(n). Generally, a cache manager 23(m) may prefetch a particular track if a host adapter's cache manager 25(n) initiates a series of staging operations for a series of preceding tracks, which can indicate that the program being processed by the associated host computer 11(n) will likely also request that the particular track be staged.

The permanently cached track flag of the track/cache information flags field 50 is set if the track is to be permanently cached in a cache slot 31(s) and not to be overwritten. A host computer's cache manager 25(n) may request that a track be permanently cached if the program being processed by the associated host computer is expected to access the records in the track frequently.

The track write pending flag is used to indicate that the information in the track has been updated by a host computer 11(n) and needs to be de-staged by a data store 20(m). While the write pending flag is set, to indicate that a de-staging operation is to be performed, the cache slot 31(s) in which the track is cached will not be used for another track until the de-staging operation has been completed. It will be appreciated that, if the permanently cached track flag is also set, after the destaging operation the cache slot 31(s) will not be used for another track, but instead the track will remain in the cache slot 31(s) as long as the permanently cached track flag is set.

The table CRC field 51 of the track descriptor 36(c)(t) stores a CRC value that corresponds to the cyclical redundancy check ("CRC") value for the track descriptor 36(c)(t). The CRC value can be generated from the information in the other fields 50, and 52–54 and the body section 41 using any convenient CRC algorithm, and can be used to verify the information in those fields 50 and 52–54 and that section 41.

The extended format code field 52 can be used to identify one of a plurality of extended format definitions for the records stored on the track, and the body section 41 contains further record formatting information for the records. Details of the record format definitions used for one embodiment of the invention will be described below. In one embodiment, sixteen record formats are defined, in which case the extended format code field 52 can be accommodated by four bits. The cache managers 23(m) can use the record format definition for the respective track as set forth in the body section 41 of the track descriptor 36(c)(t) for a track to identify the locations of particular records on the track which are to be retrieved during a staging operation the location in the particular cache slot 31(s) in the cache memory 31 in which they are to be stored. Similarly, during a destaging operation, the cache managers 23(m) can use the record format definition for the respective track to identify the location in the cache slot of records which have been updated and are to be destaged and the corresponding locations in the track in which they are to be stored during the destaging operation. In addition, the host adapters 24(n) can use the record format definition for the respective track as set forth in the body section 41 to locate the locations of records from the track, as stored in the cache slot 31(s), which are to be retrieved during a retrieval operation, and in which data is to be stored during a write operation.

The mirror flags field 53 contains one or more flags indicating whether the track has been mirrored on one or more other digital data storage subsystems, and, if so, whether the mirrors are up-to-date. In one embodiment, the digital data storage subsystem 12 is one of four in a cluster of digital data storage subsystems which serves to provide mirrors for each other, and the flags in the mirror flags field 53 indicates both on which of the digital data storage subsystems the track is mirrored, and the update status of the track on each of those digital data storage subsystems. The digital data storage subsystem can use the mirror flags 53 to verify that, if a track is mirrored, all of the mirrors are maintained in an updated and synchronous condition.

As noted above, the body section 41 contains extended format definitions for records in the track. In one embodiment, sixteen extended format definitions have been defined, with the particular extended format definition being used in connection with a track being identified by the extended format code field 32 of the track descriptor 36(c)(t). In one embodiment, all of the extended format definitions are eight bytes in length. Each of the extended format definitions will be described below:

(i) An equal records format definition, in which all the count, key and data fields of all of the records are of the same size. In the equal records format definition, the body section has a one byte records count field, which identifies the number of records stored in the track, and a seven-byte field to identify the sizes of the key and data fields of the respective records.

(ii) An equal records with special cases definition. In the equal records with special cases definition, there are four versions, identified by a value stored in the second byte of the body. In all versions, the first byte comprises a one byte records count field, which identifies the number of records stored in the track, a one byte version field which identifies the version, a one byte special record identifier field, a two-byte new data length field and a three byte field which identifies the sizes of the key and data fields of the first record. In (A) a first version, all of the records stored on the track, except the record identified by the special record identifier field, have key and data fields of the size specified in the three-byte key and data field size field, and the record identified by the special record identifier field has a data field size that is identified in the new data length field; this version is useful if all records but one have the same key and data lengths;

(B) a second version, all of the records stored on the track, except the record identified by the special record identifier field and the next record thereafter, have key and data fields of the size specified in the three-byte key and data field size field, and the record identified by the special record identifier field has a data field size that is identified in the new data length field and the next record thereafter has no key field and a data length of zero; this version is useful if all records but one have the same key and data lengths, and the record thereafter operates as an "end of field";

(C) a third version, the records stored on the track up to the record identified by the special record identifier field have key and data fields of the size specified in the three-byte key and data field size field, and the record identified by the special record identifier field has no key field and a data length of zero, thereby to operate as an "end of field," and the records thereafter have a data length as specified in the new data length field;

(D) a fourth version, all of the records stored on the track, except the record identified by the special record identifier field and the next record thereafter, have key and data fields of the size specified in the three-byte key and data field size field, and the record identified by the special record identifier field, and records thereafter, have the same key field size and a data field size that is identified in the new data length field.

(iii) A definition that will accommodate up to three records, whose data lengths can be specified by binary-encoded values of up to two bytes. This definition will accommodate records with data lengths of up to 64K (K=1024). In this definition, the first byte in the body section 41 contains a record counts field which identifies the number of records in the track, and three two-byte data length fields.

(iv) A definition that will accommodate four records whose data lengths can be specified by binary-encoded values of up to two bytes. This definition will accommodate records with data lengths of up to 64K (K=1024). In this definition, the body section 41 contains four two-byte data length fields. Since with this definition the number of records stored on the track is four, no record count field is needed.

(v) A definition which will accommodate a change in record number in connection with one of the records. In this definition, the first byte in the body section 41 contains a record count field which identifies the number of records in the track. Four of the bytes contain a record number and key length value (one byte each) and data length for the first record stored on the track. Another byte contains a record number differential value.

(vi) An even/odd format definition in which even- and odd-numbered records alternate between two different dat lengths. In this definition, the first byte in the body section 41 contains a record count field which identifies the number of records in the track, and subsequent bytes comprise two two-byte data length fields, with the first data length field identifying the data length of even-numbered records and the second data length field identifying the data length of odd-numbered records.

(vii) A format definition for use if all records but one, namely the second record, stored on the track, are of a predetermined standard format. In this definition, the first byte in the body section 41 contains a record count field which identifies the number of records in the track, and record number, key length and data length fields containing record number, key length and data length values for the second record in the track.

(viii) A format definition for use with tracks that have up to three records with the same key length and data lengths which can be accommodated with two-byte data length values. In this definition, the first byte in the body section 41 contains a record count field which identifies the number of records in the track, the second byte contains a key length field that identifies the lengths of the keys in the records, and the next six bytes contain three two-byte length fields each of which contains a length value for one of the records. In one embodiment, the length fields identify the lengths for the respective records in reverse order from the order in which they (the records) are stored on the track.

(ix) A format definition for use with tracks on which a predetermined maximum number of records (in one embodiment, up to twenty-four records) are stored, with the records having two different data lengths. In both cases, the data lengths are such as to be specified by two-byte data length fields. In this definition, the first byte in the body section 41 contains a record count field which identifies the number of records on the track. The next three bytes contain a mask field comprising a series of bits, with successive bits being associated successive records on the track; if B(i) (index "i" extending from 1 through 24) represents the "i-th" bit of the bit mask, that bit will be associated with the "i-th" record on the track (if the record exists). The next four bytes contain two two-byte data length fields. If the "i-th" bit B(i) in the bit mask is set, the length of the data field of the associated "i-th" record will be specified by one of the data length fields, and if the "i-th" bit B(i) in the bit mask is clear, the length of the data field of the associated "i-th" record will be specified by the other of the data length fields.

(x) A format definition for use with tracks on which three series of records are stored, with records within each series all having the data fields with the same length. In this definition, the first byte in the body section 41 contains a record count field which identifies the number of records on the track. The next byte contains two portions, or "nibbles," each of which contains a record pointer value that identifies one of the records stored on the track. The next six bytes contain three two-byte data length fields. The first data length field contains a data length value that identifies the length of the data fields of the records from the first record on the track up to, but not including the record identified by the first record pointer value, the next data length field contains a data length value that identifies the length of the data fields of the records from the record identified by the first record pointer value on the track up to, but not including the record identified by the second record pointer value, and last next data length field contains a data length value that identifies the length of the data fields of the records from the record identified by the second record pointer value on the track through the last record on the track.

(xi) A format definition for use with tracks on which five records are recorded, whose lengths can be accommodated by portions of respective bytes of the body section 41. In one embodiment, the eight bytes, containing sixty-four bits of the body section, are divided into four thirteen-bit fields and one twelve-bit field, with successive fields containing data length values for successive records on the track. It will be appreciated that the thirteen-bit fields can specify data lengths of up to 8K (K=1024) bytes and the twelve-bit fields can specify data lengths of up to 4K bytes.

(xii) A format definition similar to definition (xi) above, except that each record has a data length of twice that specified by that definition (xi). Thus, it will be appreciated that all of the records will have a length corresponding to a number divisible by two.

(xiii) A format definition similar to definitions (xi) and (xii) above, except that length of the last record, specified by the twelve-bit data length field, will be four times that specified by the twelve-bit data length field. Thus, it will be appreciated that the first four records will have lengths corresponding to a number divisible by two, and the last record will have a length corresponding to a number divisible by four.

(xiv) A format definition similar to definitions (xi) through (xiii) above, except that lengths of the all of the records will be four times that specified by the respective data length field. Thus, it will be appreciated that the records will have lengths corresponding to a number divisible by four.

(xv) A format definition for use with tracks on which five records are recorded whose data lengths are nearly the same. In this definition, the first two bytes of the body section contains a data length value which identifies the data length for the first record stored on the track. The next four bytes contain the low-order portions of the data length values identifying the data lengths for the other four records stored on the tracks. The high-order portions of the data length values identifying the data lengths for the other for records on the tracks are derived from the high-order portion of the data length value for the first record, as specified in the second byte in the body section, and a respective portion of the last two bytes in the body section 41. In one embodiment, the last two bytes of the body section 41 comprise four nibbles N(j) (index "j" being an integer from one to four), with the value in the respective nibble N(j) corresponding to eight plus the difference between the high-order portion of the data length value for the first record and the high-order portion of the data length value of the respective record R(j+1). Thus, the high order portion of the data length value for the respective record R(j+1) corresponds to eight plus the difference between the high-order portion of the data length value for the first record and the value contained in the nibble N(j).

(xvi) A format definition for use with tracks on which five records are recorded, and in which the high-order bytes of the data length values of two of the records are identically zero. In this definition, the records for which the high-order bytes of the data length values of two of the records are identically zero are known a priori, and in one embodiment they comprise the second and fourth records. In that case, the first six bytes of the body section 41 comprise three two-byte data length fields containing data length values for the first, third and fifth records, respectively, and the last two bytes comprise two one-byte data length fields containing data length values for the second and fourth records, respectively.

The invention provides a number of advantages. In particular, it provides a digital data storage subsystem in which formatting information for the various tracks can be efficiently stored, to efficiently accommodate formatting information for records stored on storage devices 22 whose tracks can each store large amounts of information in large numbers of records, without requiring correspondingly large track descriptors 36(c)(t).

It will be appreciated that a number of modifications may be made to the digital data storage subsystem as described above in connection with FIGS. 1 through 3. For example, although the storage subsystem 12 has been described as being connected to a plurality of host computers 11(n), it will be appreciated that the storage subsystem may be used only in connection with a single host computer 11(n). In addition, although the storage subsystem 12 has been described as including a plurality of data stores 20(m) and a plurality of storage devices 22, it will be appreciated that the storage subsystem 12 may be provided with a single data store and a single storage device.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage system comprising:
   A. at least one storage device for retrievably storing a series of records, the records being stored in a format comprising one of a plurality of format definition types;
   B. a memory for storing a descriptor for describing the format of the records stored by said storage device, the descriptor including a format definition type identifier that identifies the one of said plurality of format definition types in which said records are stored, and specific format information providing further formatting information within the one of said plurality of format definition types in which said records are stored; and
   C. a control device configured to use the format definition type identifier and specific format information in said descriptor in connection with retrievals of ones of said records from said storage device.

2. A system as defined in claim 1 in which the storage device stores records organized in a plurality of tracks, each track comprising a series of said records, the memory storing a plurality of descriptors each associated with one of said tracks.

3. A system as defined in claim 2 in which the format definition type identifier can differ as among said tracks.

4. A system as defined in claim 2 in which the specific format information can differ as among said tracks.

5. A system as defined in claim 4 in which said control device includes a cache for caching records retrieved from selected ones of said tracks, the descriptor associated with each track further including predetermined cache information for said track.

6. A system as defined in claim 5 in which the predetermined cache information for at least one of said track descriptors includes a cached flag having a cached condition indicating that the track associated with said at least one of said track descriptors is in said cache, and another condition indicating that the track associated with said at least one of said track descriptors is not in said cache.

7. A system as defined in claim 6 in which said cache includes a plurality of cache slots, the predetermined cache information for said at least one of said track descriptors further including a cache slot pointer which points to the one of said plurality of cache slots in which the track is cached if the cached flag has said cached condition.

8. A system as defined in claim 1, in which one of said format definition types is an equal records format definition, in which all of the records are of the same size and format, the format descriptor containing a format definition type identifier that identifies the equal records format definition and specific format information that identifies the number of records stored in the track and the size of the records.

9. A system as defined in claim 1, in which one of said format definition types is an equal records with one exception format definition type, in which all of the records but one are of the same size and format, the format descriptor containing a format definition type identifier that identifies the equal records with one exception format definition type and specific format information that identifies the number of records stored in the track, a record identifier that identifies the one of said records, the size of all of the records but one and the size of the one of said records.

10. A system as defined in claim 1, in which one of said format definition types is an equal records format with two successive exceptions definition type, in which all of the records, except for one record and the next record thereafter, are of the same size and format, the format descriptor containing a format definition type identifier that identifies the equal records with two successive exceptions format definition type and specific format information that identifies the number of records stored in the track, a record identifier that identifies the first of said records, the size of all of the records but two and the size of the two of said records.

11. A system as defined in claim 1, in which one of said format definition types is a two series of equal records format definition type, in which one series of the records one are of the same size and a second series of records are of the same size, and in which the sizes of in the two series may differ, the format descriptor containing a format definition type identifier that identifies the two series of equal records format definition type and specific format information that identifies the number of records stored in the track, a record identifier that identifies the record comprising the last record of the first series, and the sizes of one of said records in each of the respective first second series.

12. A system as defined in claim 1 in which one of said format definition types is a two series of equal records format definition type, in which one series of the records are of the same size and a second series of records are of the same size, and in which the sizes of in the two series may differ, the format descriptor containing a format definition type identifier that identifies the two series of equal records format definition type and specific format information identifies the number of records stored in the track, a record identifier that identifies the record comprising the first record in the second series, and the size of one of said records in the second series.

13. A system as defined in claim 1 in which one of said format definition types is a predetermined number of records format definition type, in which the storage device stores a predetermined number of records, the format descriptor containing a format definition type identifier that identifies the predetermined number of records format definition type and the specific format information identifies the size of each of said records.

14. A system as defined in claim 1 in which one of said format definition types is an alternating record sizes format definition type, in which said storage device stores records of alternating sizes, the format descriptor containing a format definition type identifier that identifies the alternating record sizes format definition type, and the specific format information identifies the number of records stored on the track, and the two respective sizes.

15. A system as defined in claim 1 in which one of said format definition types is an equal standard record sizes but one format definition type, in which the storage device stores records all but one of which is a predetermined size, the format descriptor containing a format definition type identifier that identifies the equal standard record sizes but one format definition type, and the specific format information identifies the size of the one record.

16. A system as defined in claim 15 in which the one record is a predetermined one of said records in said series of records stored on said storage device.

17. A system as defined in claim 1 in which one of said format definition types is a predetermined maximum number of records format definition type, in which the storage device stores a predetermined maximum number of records, the format descriptor containing a format definition type identifier that identifies the predetermined maximum number of records format definition type and the specific format information identifies the number of records and the size of each of said records.

18. A system as defined in claim 1 in which one of said format definition types is a predetermined maximum number of records of two different sizes format definition type, in which the storage device stores a predetermined maximum number of records of two different record sizes, the format descriptor containing a format definition type identifier that identifies the predetermined maximum number of records of two different sizes format definition type, and the specific format information identifies the number of records, the two sizes, and a mask comprising a series of bits each associated with one of the series of records stored on the storage device, each bit having one of two conditions, each condition being associated with one of the sizes, with the condition of the respective bit identifying the associated one of the sizes for the respective record.

19. A system as defined in claim 1 in which one of said format definition types is a predetermined number with varying sizes format definition type, in which the storage device stores a predetermined number of records, with each record having a record size, the format descriptor containing a format definition type identifier that identifies the predetermined number with varying sizes format definition type, and the specific format identification contains a value associated with each record that is associated with the size of each of said records.

20. A system as defined in claim 1 in which one of said format definition types is a predetermined number of records of similar size format definition type, in which the storage device stores a predetermined number of records, with each record having a record size, and the record sizes being similar, the format descriptor containing a format definition type identifier that identifies the predetermined number of records of similar size format definition type, and the specific format identification contains a record size value associated with the size of one of said records, and record size delta values which, when processed with the record size value, are associated with the sizes of each of the other records.

* * * * *